(12) United States Patent
Brand (10) Patent No.: US 9,104,192 B2
(45) Date of Patent: Aug. 11, 2015

(54) SYSTEM AND METHOD FOR CONTROLLING MACHINES ACCORDING TO PATTERN OF CONTOURS

(75) Inventor: Matthew Brand, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 517 days.

(21) Appl. No.: 13/535,266

(22) Filed: Jun. 27, 2012

(65) Prior Publication Data

US 2014/0005804 A1    Jan. 2, 2014

(51) Int. Cl.
 *G05B 19/31* (2006.01)
 *G05B 19/4103* (2006.01)

(52) U.S. Cl.
CPC ............ *G05B 19/31* (2013.01); *G05B 19/4103* (2013.01); *G05B 2219/34112* (2013.01); *G05B 2219/36199* (2013.01); *G05B 2219/45041* (2013.01); *G05B 2219/49372* (2013.01)

(58) Field of Classification Search
CPC .............. G05B 19/31; G05B 19/4103; G05B 2219/49372; G05B 2219/36199; G05B 2219/45041; G05B 2219/34112
USPC .................. 700/160, 172, 181, 184, 188–192
See application file for complete search history.

(56) References Cited

U.S. PATENT DOCUMENTS

| | | | |
|---|---|---|---|
| 5,847,960 A * | 12/1998 | Cutler et al. | 700/187 |
| 5,879,278 A * | 3/1999 | Cox | 493/67 |
| 6,128,546 A * | 10/2000 | Basista et al. | 700/166 |
| 6,609,044 B1 * | 8/2003 | Basista et al. | 700/166 |
| 6,909,937 B2 * | 6/2005 | Sugiyama et al. | 700/173 |
| 7,702,416 B2 * | 4/2010 | Ravish et al. | 700/181 |
| 2002/0004687 A1 | 1/2002 | Hunter et al. | |
| 2007/0106416 A1 * | 5/2007 | Griffiths et al. | 700/166 |
| 2009/0082892 A1 | 3/2009 | Tang et al. | |
| 2013/0340580 A1 * | 12/2013 | Strong et al. | 83/13 |

OTHER PUBLICATIONS

Han G. C. et al. "A Study on Torch Path Planning in Laser Cutting Processes. Part 2: Cutting Path Optimization Using Simulated Annealing," Journal of Manufacturing Processes, Society of Manufacturing Engineers, Dearborn, MI, US. vol. 1, No. 1, Jan. 1, 1999.

Jeffrey Hoeft, Udatta S. Palekar. "Heuristics for the Plate-Cutting Traveling Salesman Problem," IIE Transactions, vol. 29. Sep. 1, 1997. p. 719-731.

(Continued)

*Primary Examiner* — Ramesh Patel
(74) *Attorney, Agent, or Firm* — Dirk Brinkman; Gene Vinokur (57) ABSTRACT

A set of costs representing operations of a machine along a set of trajectories connecting a set of exit and entry points on contours of a pattern is determined. Each trajectory represents an operation of the machine proceeding from an exit point with an exit velocity to an entry point with an entry velocity according to dynamics of the machine. The set of trajectories includes at least one trajectory representing the operation along a contour with non-zero velocities at corresponding exit and entry points, and at least one trajectory representing the operation between different contours with non-zero velocities at the corresponding exit and entry points. A sequence of the trajectories optimizing a total cost of operation of the machine tracking the pattern is determined based on the costs, and a set of instructions for controlling the machine is determined according to the sequence.

24 Claims, 9 Drawing Sheets

(56) References Cited

OTHER PUBLICATIONS

Kenneth Castelino et al. "Toolpath optimization for minimizing airtime during machining," Journal of Manufacturing Systems. vol. 22, No. 3. Jan. 1, 2003. p. 173-180.

Rubinovita et al. "Task Level Off-line Programming System for Robotic Arc Welding—An Overview." Journal of Manufacturing Systems, No. 4, Dearborn MI, US. 1998. p. 293-305.

Jeffrey Hoeft, et al. "Heuristics for the Plate-Cutting Traveling Salesman Problem," IIE Transactions (1997) 29, pp. 719-731.

* cited by examiner

SYSTEM AND METHOD FOR CONTROLLING MACHINES ACCORDING TO PATTERN OF CONTOURS

FIELD OF THE INVENTION

This invention relates generally to a system and a method for generating motion plans for machines, and more particularly to determining a set of instructions for controlling the machines according to a pattern of contours.

BACKGROUND OF THE INVENTION

In computer numerically controlled (CNC) machining, a tool-head is moved relatively to a-work-piece according to a predetermined pattern to perform machining of the work-piece. The machining can include various types of processing of the work-piece, such as cutting or drilling the work-piece. For simplicity of explanation and without loss of the generality, in this disclosure the machining is exemplified as a process of cutting the work-piece using a laser cutting machine.

Cutting features from sheet material according to a pattern is a common manufacturing process. Generally, a cutting head of a laser cutting machine is translated in a bounded plane along orthogonal axes. Laser cutters of this type are often used to cut discreet features from sheets of materials, e.g., plastic and metal sheets of varying thickness. Control of the laser cutter is usually performed by a computer numerical controller (CNC) following a prescribed set of instructions, sometimes implemented as "NC-code," or "G-code."

If the pattern to be cut includes disconnected contours, the machining alternates with repositioning, e.g., after a cut a machine turns off the cutter, traverses to a new location, and turns the cutter back on to continue the machining. The motions of the machine are planned based on the pattern, e.g., a drawing of all the curves of the contours to be cut. Usually some of the curves are closed to represent a shape to be cut out of the material. The planning problem can include determining a minimum-time or minimum-energy tour of all the cuts. This tour specifies the order of the cuts.

Until recently, all machining was characterized by stop-and-start motions. During the machining, the cutting head approaches the entry point of a planned cut curve of a contour of the pattern, stops, turns on the cutter, and then proceeds with the next cutting motion. Consequently the fastest cut-to-cut traverses, also known as "rapids", were straight lines. The planning problem for "stop-start" machining can includes jointly finding an order of the cuts and the shortest straight traverses between the cuts. One conventional solution of such planning problem uses a variation of the traveling salesman problem (TSP). See, for example, Hoeft & Palekar: "Heuristics for the Plate-Cutting TSP," IIE Transactions vol. 29, 1997.

However, the "stop-start" behavior of the laser cutter presumed by these motion plans limits the production rate of the machine. For high-speed machining, numerous accelerations and decelerations impose a high energy cost and can wear out the machine.

Advances in cutting technologies now enable cutting "on-the-fly", that is, without stopping to turn the cutter ON or OFF. This enables faster tours, but also poses a much more complicated planning problem, because straight traverses in on-the-fly machining can be quite suboptimal. However, substituting the straight traverses with other type of traverses is suboptimal, because this solution does not fully consider dynamical properties of the machine, see, e.g., U.S. Pat. No. 6,609,044. Other solutions involve hand-drawn tours, but obviously this is not a practical method for large planning problems.

Accordingly, there is a need to automatically generate efficient, dynamically optimized motion plans for controlling a machine according to a pattern of disconnected contours.

SUMMARY OF THE INVENTION

It is the object of the various embodiments of the invention to provide a system and method for determining a set of instructions for controlling a machine according to a pattern of contours, e.g., a pattern of disconnected contours. Some embodiments provide a method for generating motion plans for on-the-Fly machining including one or combination of an ordering of processing motions, such as cutting or traversal without cutting, entry and exit points on the contours for these motions, dynamically optimal traverse trajectories between these exit and entry points, and a velocity profile for motion at various points along the motion plan.

Some embodiments are based on a realization that to optimize the speed of the machining, a tool-head of a machine should proceed to enter and exit points of each segment contour on a tangent, while optimally matching the maximum cutting speed for that segment based on its curvature and dynamics of the machine. This realization allows to determine a tour, i.e., a sequence of trajectories including, e.g., cut and traverse trajectories, allowing tracking the pattern in dynamically optimal manner. An example of traverse trajectory is a repositioning of the tool-head of the machine without the actual machining.

The velocity vector at each end of a traverse trajectory can be determined by a shape of the segment of the cut contours being exited and entered. The optimal trajectory between these vectors can be determined based on dynamics of the machine, e.g., the momentum, speed limits, or acceleration limits of the machine. Some embodiments are employed in a process of cutting the work-piece using a laser cutting machine, which allows large accelerations. Other embodiments are employed by other type of machining, for example, scribing, engraving, and plotting.

Often the optimal traverse trajectory is curved. Due to the dynamics of the machine, curved traverse trajectories can be faster and more energy-efficient than straight traverses. A further complication is that some cutters may have "no-fly zones," which the cutting head must avoid during the traverses. For example, a hot head might warp thin material and thus all traverses should only pass over waste material.

Further, some embodiments are based on a specific realization that velocity vectors can be assigned to various possible exit and entry points on the contours of the pattern, and the cost of proceeding from one exit point to one entry point in any tour is indicative, e.g., equal, of the cost of the dynamical optimal trajectory that moves the operation of the machine from an exit point with an exit velocity to an entry point with an entry velocity. Such realization allows determining a set of candidate traverse trajectories, and selecting the tour using various optimization techniques.

Accordingly, one embodiment discloses a method for controlling a machine according to a pattern of unconnected contours. The method determines a set of costs representing operations of the machine along a set of trajectories connecting a set of exit and entry points on the contours of the pattern, wherein each trajectory represents an operation of the machine proceeding from an exit point with an exit velocity to an entry point with an entry velocity according to dynamics of the machine. The set of trajectories can include at least one trajectory representing the operation along a contour with non-zero velocities at corresponding exit and entry points, and at least one trajectory representing the operation between different contours with non-zero velocities at the corresponding exit and entry points. Next, the method determines, based on the costs, a sequence of the trajectories optimizing a total cost of operation of the machine tracking the pattern, and determines a set of instruction for controlling the machine according to the sequence.

Another embodiment discloses a method for controlling a laser cutting machine according to a pattern of disconnected contours. The method includes steps of constructing a graph including nodes and edges, wherein nodes of the graph represent entry and exit points on the contours, cut-edges represent cuts along the contours between adjacent nodes, and traverse-edges represent dynamically optimal trajectories between entry and exit points on different cut contours; determining a tour through all the nodes and cut-edges, and at least some traverse-edges of the graph, such that the tour optimizes a total cost of performance; and converting the tour into a set of instruction for controlling the machine. The steps of the method are performed by a processor.

Yet another embodiment discloses a laser cutting machine, including a laser cutter for cutting a work-piece according to a pattern of disconnected cut contours; a control module for navigating the laser cutter according to a set of instruction, such that the laser cutter tracks cut-edges and traverse-edges without stopping; and a motion planning module for generating the set of instruction based on the pattern, wherein the set of instruction is generated based on a tour optimizing a total cost of operation of the laser cutter tracking the pattern, wherein the motion planning module determines a set of cut-edges and a set of traverse-edges, wherein a trajectory in the set of traverse-edges is a dynamically optimal trajectory, and wherein the motion planning module applies a traveling salesman problem (TSP) solver to produce the tour.

Yet another embodiment discloses method for determining a set of instructions for controlling a machine according to a pattern of disconnected contours. The method includes steps of acquiring the pattern of disconnected contours and at least one of dynamics of the machine; and generating a set of instructions for controlling the machine according to a sequence of the trajectories optimizing a total cost of operation of the machine tracking the pattern, wherein the sequence of trajectories includes at least one trajectory representing the operation along a contour with non-zero velocities at corresponding exit and entry points, and at least one trajectory representing the operation between different contours with non-zero velocities at the corresponding exit and entry points.

DETAILED DESCRIPTION OF THE PREFERRED EMBODIMENT

Figure 1A:
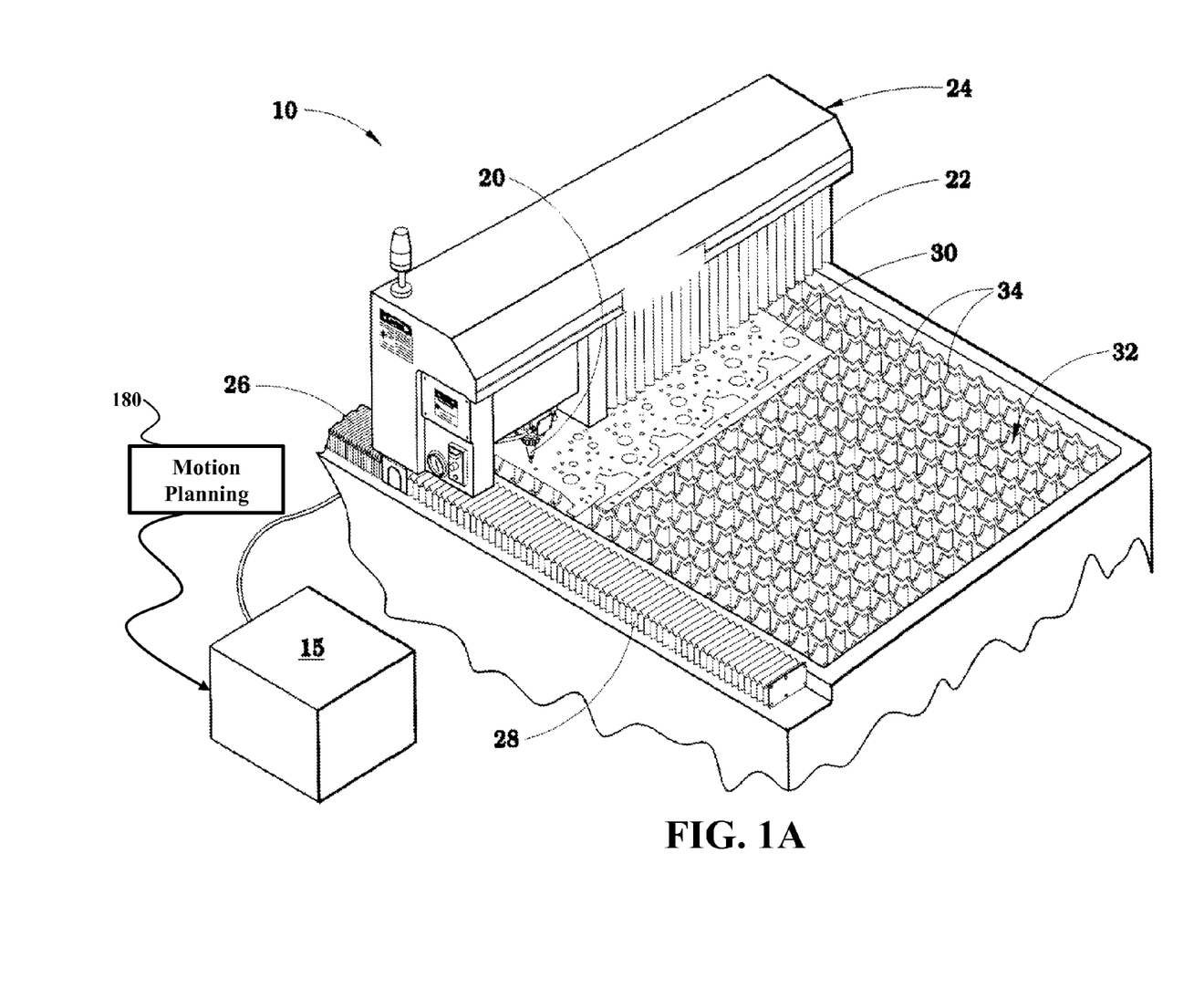
FIGS. 1A-B are schematics of laser cutting machines embodied some embodiments of invention.

FIG. 1A shows an example of a laser cutting machine 10 suitable for being controlled by some embodiments of the invention. For simplicity of explanation and without loss of the generality, the machining is exemplified as a process of cutting the work-piece using a laser cutting machine.

The machine 10 is configured for moving the laser head 20 in any direction parallel to the surface of a piece of sheet material that is to be cut into specific shapes. The laser head 20 is a non-contact device which typically maintains a distance when in its "down" position from the tip of the laser head to the top surface of the sheet material being cut. Other types of laser heads, including "contact"-type heads are also possible.

The laser head 20 is mounted on a carriage so as to be able to move back and forth in a linear direction perpendicular to the longitudinal dimension of the main table of the laser cutting machine. As the laser head 20 traverses in this perpendicular direction, an accordion-like curtain designated 22 that can be compressed or extended, accordingly. The laser head carriage structure 24 is also capable of movement in the longitudinal direction along the main axis of the machine 10, and an accordion-like curtain on either side of the laser head structure 26 and 28, can either compress or expand, accordingly. The movements of the laser head 20 are typically controlled by a computer numerical controller 15.

For example, a planar part 30 made of a sheet material is placed on top of a special bed-like structure 32. Bed-like structure 32 is made up of an X-Y grid structure of relatively thin metal sheet material, which is constructed to create multiple "points" 34 which support the bottom surface of the sheet material 30.

Typically, a small air gap is maintained between the tip of laser head 20 and the top surface of the sheet material 30. When a piece of the sheet material 30 has been cut out, but fails to fall all the way to the bottom of the bed 32. Sometimes, the cut out piece can become "hung up" on the top portion of the bed 32.

Figure 1B:
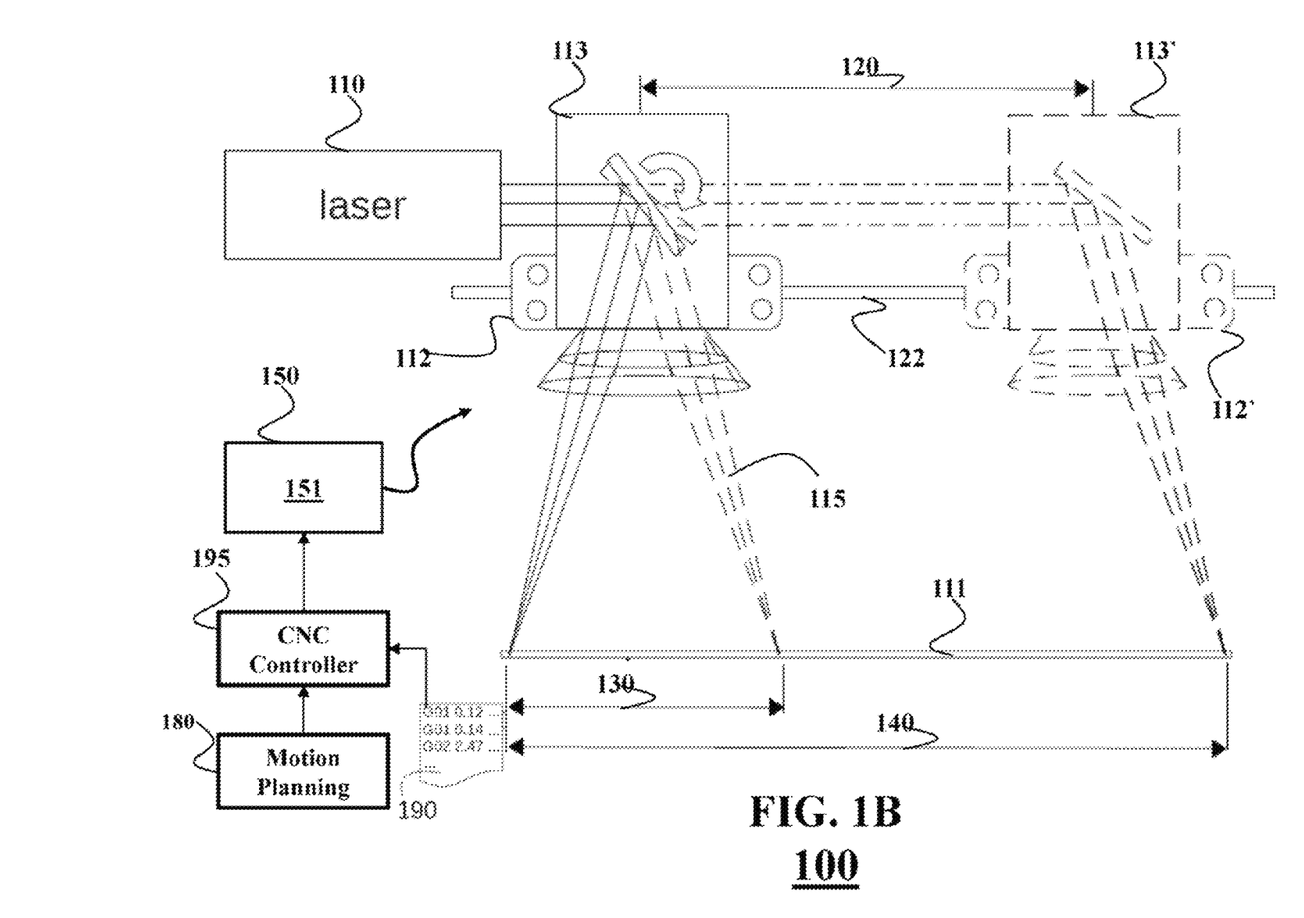

FIG. 1B shows a block diagram of another example of a laser cutting machine 100 suitable for being controlled by some embodiments to position of a beam 115 produced by a laser 110 on a work-piece 111. For simplicity of explanation and without loss of the generality, the machining is exemplified as a process of cutting the work-piece using a laser cutting machine, such as the machines 10 or 100. However, other variation of the machine suitable to employ embodiments of the invention, other variations of the laser cutting machine, and other variations of the design of the laser cutting machines 10 or 100 are possible and within the scope of the invention.

The laser cutting machine 100 can include a platform 112 configured to move along at least a first direction 120. The platform is moved by a motion system 122 for moving the platform in a plane parallel to the work-piece. In one embodiment, the motion system 122 includes a first prismatic joint facilitating a first motion of the platform along the first direction 120.

Additionally or alternatively, the laser cutting machine can include a galvano-head 113 arranged, e.g., on the platform 112, such that the motion of the platform along the first direction 120 causes a motion of the galvano-head along the first direction. For example, the galvano-head can include a reversible DC motor, equipped with a mirror on an output shaft, and usually with built-in bump stops, to limit rotation of the mirror to a small angle, typically +/−20 to 30 degrees about the center. The galvano-head is often configured as a single integrated unit.

For example, the motion of the platform to a position 112' moves the galvano-head to a position 113'. Also, an operation of the galvano-head directs the laser beam to the work-piece along at least a second direction 130. The galvano-head can be arranged on the platform such that the second direction 130 is fixed with respect to the first direction 120, which allows directing the laser beam concurrently along the first direction and along the second direction. In various implementations of the machine 100, the position of the laser beam on the work-piece is a vector sum 140 of the first motion, and the second motion.

The motion of the platform and the operation of the galvano-head can be controlled by a control module 150. The control module 150 can be implemented using a processor 151. In some embodiments, the control module includes a computer numerical control (CNC) controller 195. The control module controls the motion system and the galvano-head according to G-code 190 that defines a trajectory of positions of the laser beam. For example, the G-code 190 encodes positions for the X-axis platform as motion on the G-code axis X, the Y-axis gantry as motion on G-code axis Y, X-motion galvano and mirror as motion on G-code axis A, and Y-motion galvano and mirror as motion on O-code axis B. This four-axis G-code is interpreted by the controller in during the operation of the laser cutting machine. Also, the machine can include a motion control module 180 for determining a set of instructions, e.g., in a form of G-code 190, to control the machine according to the patter, The laser cutting machines 10 and 100 are examples of technology that enables cutting or other type of machining "on-the-fly," that is, without stopping to turn the cutter ON or OFF. This enables faster tours, but also poses a much more complicated planning problem, because the straight traverses for such machine can be suboptimal.

Figure 2:
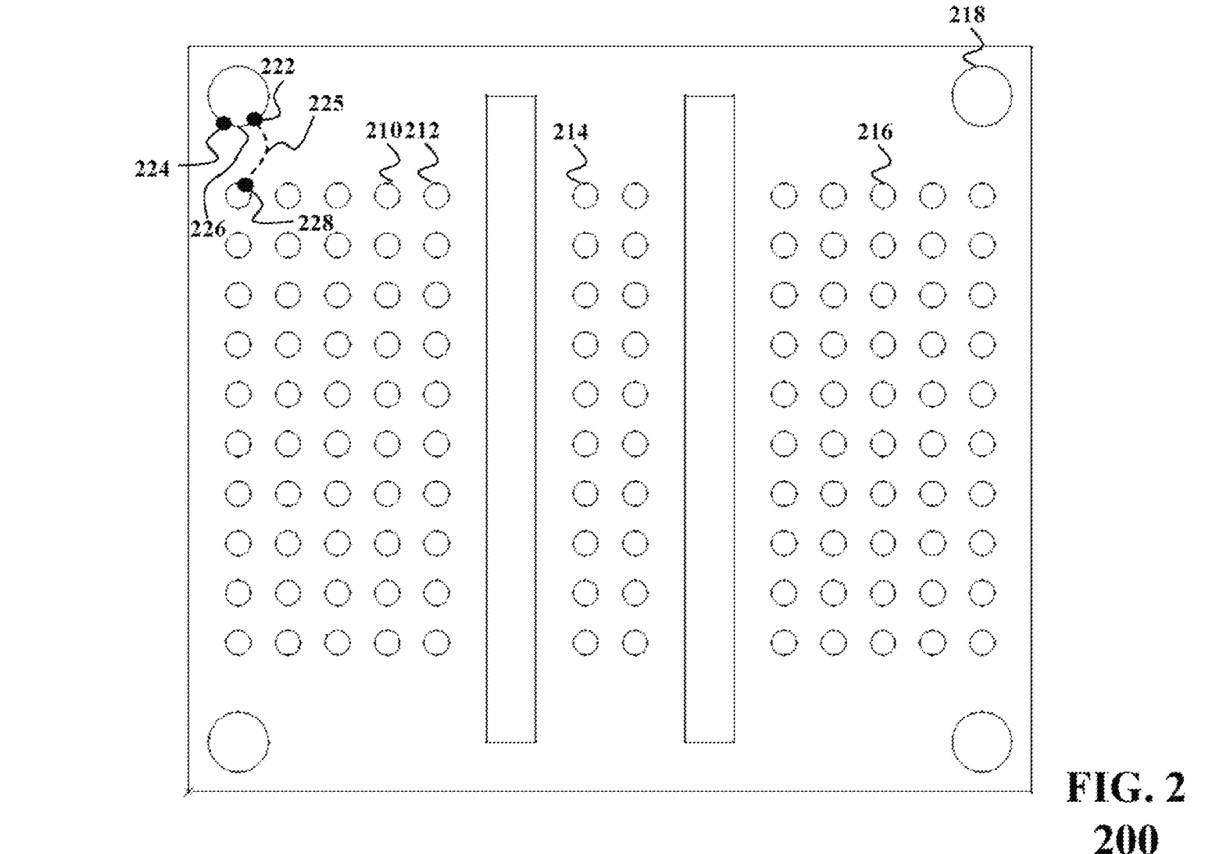
FIG. 2 is an exemplar pattern of disconnected contours.

FIG. 2 shows an example a pattern 200 of disconnected contours, such as the contours 210, 212, 214, 216, and 218, which can be used for cutting the material of the work-piece. Because the pattern 200 includes disconnected contours, the machining of the work-piece according to the pattern alternates with repositioning, e.g., after a cut a machine turns off the cutter, traverse to a new location, and turn the cutter back on to continue the machining. In various embodiments, the machine, such as laser cutting machine, does not stop before starting and during tracking trajectories representing the operation between different contours.

Accordingly, cutting trajectories, i.e., the trajectories of cutting along the contour, such as trajectory 226, can alternate with traverse trajectories, i.e., the trajectory of repositioning the cutter to a new position without cutting, such as the trajectory 225. End points of each trajectory include an exit point of starting the trajectory from the contour and an entry point of entering the trajectory into the contour. The endpoints are located on one of the contours of the pattern. Typically, the endpoints of the cutting trajectory are on the same contour, e.g., points 222 and 224 of the trajectory 226. However, the endpoints of the traverse trajectory are typically on different contours, e.g., points 222 and 228 of the trajectory 225. Each endpoint can be the exit point, the entry point, or both.

The order of cutting and the entry/exit points are not given and determined by some embodiments of the invention. Additionally, some embodiments determine the shape of the trajectories and the timing of proceeding along the trajectories, which in turn control the shape and timing of both traverse and cutting motion of the machine. Also, in some embodiments, the order of the entry/exit points, the shape of the trajectories and the timing are jointly optimized. This joint optimization can be advantageous over other methods, which determine the ordering and sometimes the entry points, but suboptimally leave shape and timing to be determined later by a motion controller.

Figure 3:
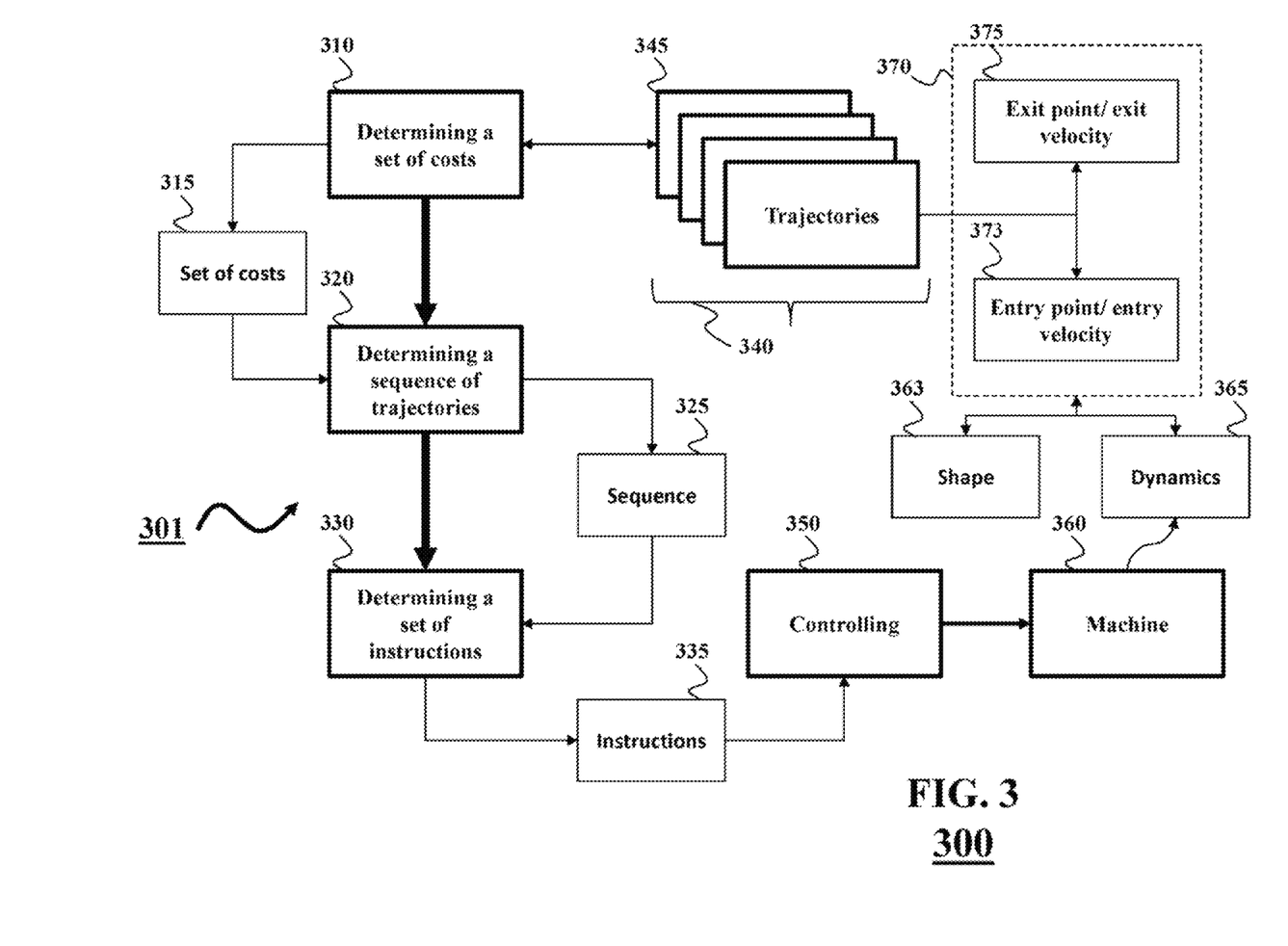
FIG. 3 is a block diagram of a method for controlling a machine according to a pattern of disconnected contours according to some embodiments of the invention.

FIG. 3 shows a block diagram of a method for controlling a machine according to a pattern of disconnected contours according to some embodiments of the invention. Specifically, one embodiment determines a tour, e.g., a sequence 325 of at least some of the trajectories 340 optimizing a total cost of operation of the machine 350 tracking the pattern, and determines a set of instruction 335 for controlling 350 the machine according to the tour. In some embodiments, the set of instructions includes position, velocity and ON/OFF command signal of machining the work-piece according to the pattern.

Steps of the method can be performed by a processor 301. For example, the steps of the method can be implemented by the control module 50 and/or by a motion planning module 180 that can be implemented, e.g., as a part of the controller 195. The motion planning module can generate the instructions 335, e.g., in form of G-code 190.

Some embodiments are based on a general realization that to maintain high velocity, a tool-head of a machine should enter and exit each segment of a contour on a tangent, optimally matching the maximum cutting velocity for that segment allowed by a shape of the segment and the dynamics of the machine. Specifically, the velocity vector at each end of a traverse can be determined by the shape of the segment of the contour being exited and entered. The optimal trajectory between these vectors can be determined by dynamics of the machine, e.g., the momentum, velocity limits, and acceleration limits of the machine.

Further, some embodiments are based on a specific realization that various possible exit and entry points on the contours of the pattern can be assigned a velocity vector, and the cost of proceeding from one exit point to one entry point in any tour is indicative, e.g., equal, of the cost of the dynamical optimal trajectory that moves the operation of the machine from an exit point with an exit velocity to an entry point with an entry velocity. Such realization allows determining a set of candidate traverse trajectories, and selecting the tour using various optimization techniques.

Further, some embodiments based on another realization that it is advantageous to control the machine according to a set of instructions including a sequence of the trajectories optimizing a total cost of operation of the machine tracking the pattern, wherein the set of trajectories includes at least one trajectory representing the operation along a contour with non-zero velocities at corresponding exit and entry points, and at least one trajectory representing the operation between different contours with non-zero velocities at the corresponding exit and entry points.

Accordingly, one embodiment of the invention determines 310 a set of costs 315 representing operations of the machine 360 along a set of trajectories 340 connecting a set of exit and entry points on the contours of the pattern. Each trajectory, e.g., a trajectory 345, represents 370 an operation of the machine proceeding from an exit point with an exit velocity 375 to an entry point with an entry velocity 373 according to dynamics of the machine 365. The dynamics of the machine 365 can include maximum acceleration of the machine. Typically, the set of trajectories includes at least one trajectory representing the operation along a contour with non-zero velocities at corresponding exit and entry points, e.g., the trajectory 226 of FIG. 2, and at least one trajectory representing the operation between different contours with non-zero velocities at the corresponding exit and entry points, e.g., the trajectory 225 of FIG. 2.

In some variations, the trajectories 340 are dynamical optimal trajectories determined based on optimal cutting velocity vectors associated with the corresponding exit and the entry points. Each velocity vector includes a value and a direction of the velocity of the operation of the machine. For example, a velocity vector for each exit and entry point can be determined based on a shape 363 of a contour at a location of the point, and the dynamics of the machine 365. For example, the exit velocity and the entry velocity can be determined based on a maximum velocity suitable for machining a segment of a contour connecting the exit and the entry points. In another embodiment, the dynamically optimal trajectory connecting segment endpoints using splines.

The costs 315 represent cost of the operation of the machine according to corresponding trajectory. More generally, the cost of the trajectory can be any function of its time, distance, energy, etc. For example, the cost can be based on a time of the tracking, energy required to track the trajectory or other consumables. Next, based on the costs 315, a sequence 325 of the trajectories optimizing a total cost of operation of the machine tracking the pattern is determined 320. Various embodiments use various optimization techniques, some of them are described below.

The sequence 325 forms a tour tracking the pattern, which includes a subset of the trajectories 340 in a predetermined order. Moreover, because the trajectories 340 are determined based on the dynamics 365 of the machine before the optimization, the determining 320 also selects the optimal subset, and thus determines the shape of the trajectories and the time of its traverse. Next, the set of instruction 335 for controlling 350 the machine 360 can be determined 330 according to the sequence, and e.g., stored in a memory or transmitted to the controller.

Some embodiments are based on another realization that the costs optimization problem for determining a tour can be posed as a traveling salesman problem (TSP), e.g., non-metric TSP, wherein the solution of the TSP is the desired tour over the set of trajectories. In some embodiments, the costs are calculated without explicitly calculating the trajectories, so a vast number of possible traverses can be considered in TSP.

Advantageously, the TSP can be constructed in a real time, a nearly optimal solution can also be obtained in a reasonable amount of time, and various third-parties or custom TSP solvers can be used by various embodiments. TSP solvers include branch-and-bound algorithm, cutting-plane method, Lin-Kernighan method, simulated annealing, genetic algorithm, Tabu search, Boltzmann machine and other solvers.

For example, some embodiments construct a TSP graph including a set of cut-edges and a set of traverse-edges, wherein end points of the cut-edges form the nodes of the graph, and a trajectory in the set of traverse-edges is a dynamically optimal trajectory connecting a pair of nodes from different contours. Thus, a TSP solver applied to the graph can produce a dynamically optimal tour.

The TSP graph is a node-and-edge graph in which each node represents a possible cut entry or exit point, and each edge represents either an optional traverse trajectory or a required processing motion, such as cutting. In this disclosure, these motions are called cuts, although in some embodiments of the invention other processes may be applied to the work-piece. Every edge in the graph is assigned a cost, usually reflecting use of time, energy, or some other consumable. Some embodiments determine a minimum-cost tour on this graph that passes through all nodes and all edges that represent cuts. The minimum-cost tour gives an optimal sequence of cut entries, exits, and traverses. In some embodiments the tour completely specifies motion of the machine. In others embodiments, the tour is dynamically smoothed to obtain a minimal-energy or minimal cost motion plan.

The TSP graph includes nodes representing cut endpoints and edges representing cuts, i.e., cut-edges or traversals, i.e., traverse-edges, between cuts. In various embodiments, the cut-edges are forced into the TSP solution. Then, a TSP solver additionally selects a subset of traverse-edges to make a complete tour, which includes a minimal-cost ordering of the cuts connected by dynamically optimal traversal trajectories. Some embodiments use generic TSP solvers or devise a custom solver for determining the tour starting with the set of all cut edges.

Thus, in some embodiments, the motion planning problem is reduced to a non-metric TSP on a TSP graph with some edges forced into the tour by one or combination of the following: (1) constructing the TSP graph; (2) determining cost of edges of the TSP graph; (3) solving the TSP graph to determine a tour; and (4) converting of the tour sequence into a dynamically optimal physical trajectory.

Determining TSP Graph

Figure 4A:
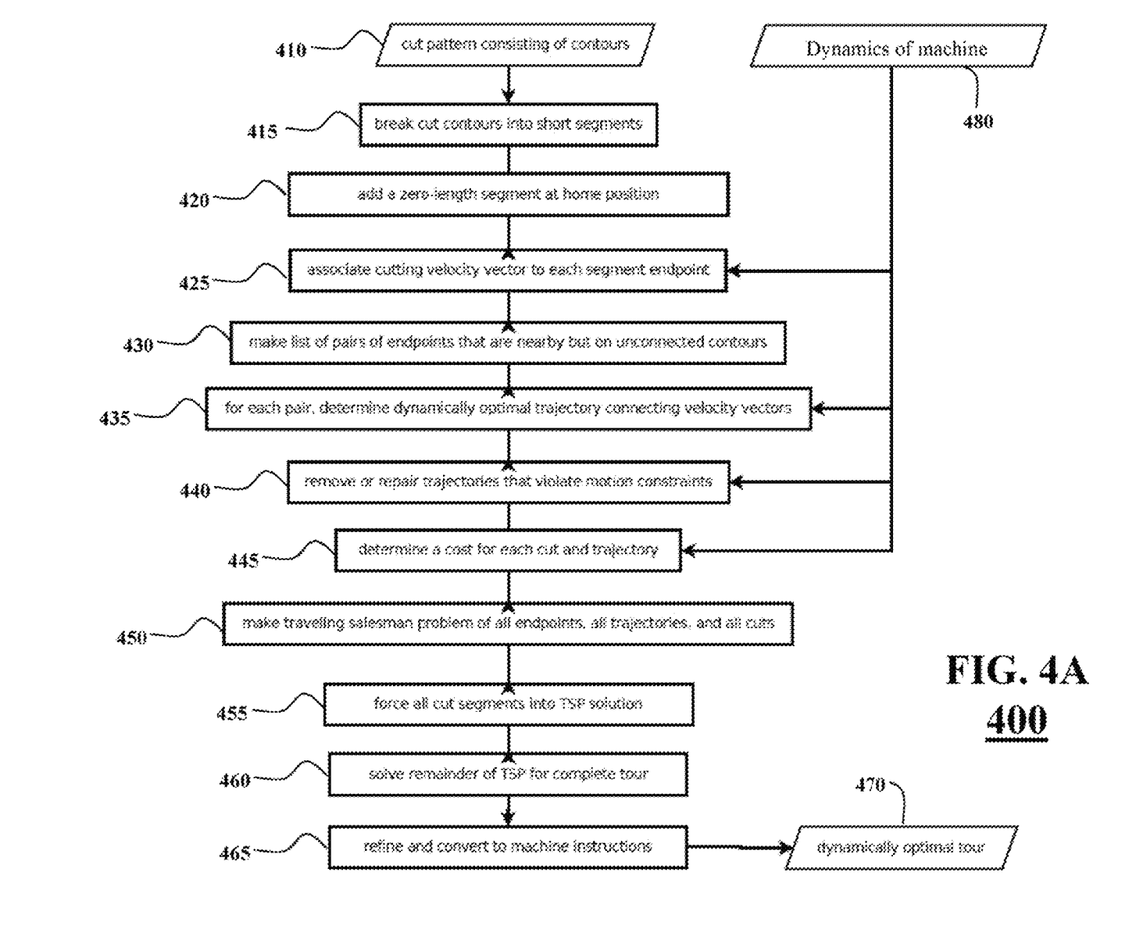
FIGS. 4A-B are flow charts of variations of a method for determining and solving traveling salesman (TSP) problem according to some embodiments.
Figure 4B:
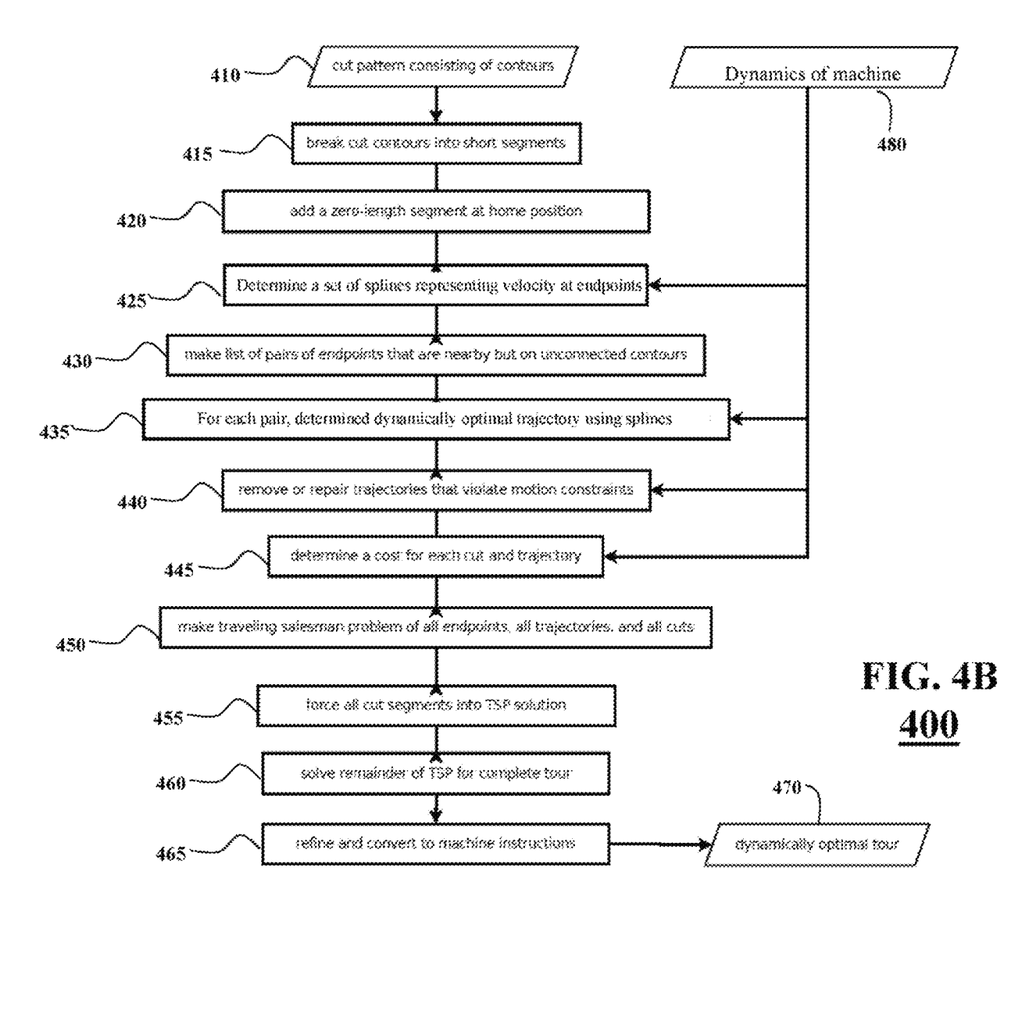

FIG. 4A shows a flow chart of a method 400 for determining the TSP graph and solving the TSP graph to determine the dynamically optimal tour 470 according to some embodiments. FIG. 4B shows a flow chart of the method 400 according to alternative embodiment. Given a set of contours 410 to cut, every contour is partitioned 415 into a set of segments. The two endpoints of each segment each contribute a node to the TSP graph. The segment contributes an edge to the TSP graph that connects the endpoint nodes. This edge represents cutting. For each of the endpoint nodes, an entry or exit velocity vector is determined 425 according to the shape of the segment and the maximum cutting speed of the machine for that segment. In a typical embodiment, the vector is tangential to the cut, and the magnitude of the vector is inversely related to the curvature of the cut at the point of entry or exit. In alternative embodiments, various functions representing optimal velocity at endpoints can be used. For example, in the embodiment of FIG. 4B, a set of splines representing velocity at each end points is determined 425'.

In some embodiments, one or two additional nodes are added 420 to the TSP graph to represent the start and end positions of the machining. The start and end positions can be different or the same positions, e.g., the home position of the machine. Each of these nodes has a zero-velocity vector, and the TSP solution is forced to pass through these nodes in sequence as if they were endpoints of a cut.

A traverse-edge is added to the TSP graph for each pair of exit and entry points. In some embodiments, for each node in the graph, a set of physically close nodes of the entry or exit points that lie on unconnected contours are determined 430, e.g., based on a Euclidean distance between the nodes. In these embodiments, the traverse trajectories are determined only for pairs of close nodes, thus reducing a number of computations. Additionally, one embodiment limits the pairs of close nodes to ones that can be reached without traversing over any "no-fly zones." Some implementations, determine these close nodes by entering all nodes locations into a k-D tree and performing a range query or ball query in the spatial neighborhood of each node.

For each pair of endpoints representing the pair of close nodes, some embodiments determine the dynamically optimal traverse trajectories, e.g., based on time or energy of traverse, from one endpoint, beginning with its associated velocity vector, to the other endpoint ending with its associated velocity vector. The trajectories can be determined based on velocity vectors. For example, for each pair of endpoints, dynamically optimal trajectories connecting velocity vectors are determined 435, as shown in FIG. 4A. Alternatively, the traverse trajectories can be determined based on other functions representing the velocity, e.g., using splines 435', as shown in FIG. 4B.

The traverse trajectory is limited by dynamics or motion constraints of the machine 480, such as maximum velocity, maximum acceleration, jerk, and motion range of the machine. The dynamics of the machine can be defined, e.g., by the specification of the machine. In some embodiments, the trajectories that violate motion constraints or cross the no-fly zone are removed 440 from the graph.

For example, in one embodiment, the dynamically optimal trajectory $x(t)$, $0 < t < T_{max}$ is a solution to $$\min_{x(t)} T_{max} \quad \text{(time)}$$

$$\text{or} \min_{x(t)} \int_0^{T_{max}} x''^2(t)dt \quad \text{(energy)}$$

$$\text{s.t.} \quad x(0) = x_{exit} \quad \text{(positions)}$$

$$x(T_{max}) = x_{entry}$$

$$x'(0) = v_{exit} \quad \text{(velocities)}$$

$$x'(T_{max}) = v_{entry}$$

$$\forall_t \; x_{lim} \geq |x_{(t)}| \quad \text{(position limits)}$$

$$\forall_t \; v_{lim} \geq |x'_{(t)}| \quad \text{(velocity limits)}$$

$$\forall_t \; a_{lim} \geq |x''_{(t)}| \quad \text{(acceleration limits)}$$

$$\forall_t \; j_{lim} \geq |x'''_{(t)}| \quad \text{(jerk limits)}$$

The optimal trajectory can be determined based on variations of CNC control. For example, the traverse trajectory differs from trajectories determined by CNC control in that the target velocities and headings have to be reached, not just target positions. In that regard, the motion planning problem is more akin to spacecraft control.

In most machines, X axis motion and Y axis motion can be controlled independently, so the optimal traverse trajectory can be calculated independently in directions X and in Y. For example, if only velocity and acceleration limits apply, then the motion profile in each dimension is a concatenation of 1-4 quadratic curves. For example, consider horizontal motion only. If a candidate traverse involves exiting a cut heading leftward but then entering a cut to the right, the traverse cost is the time to fully decelerate, then maximally accelerate rightward into the next cut (possibly decelerating to match the cutting velocity). The minimum total time for the horizontal motion is thus obtained by solving a quadratic equation. In general, the 2D trajectories are curves of degree less than eight.

A traverse-edge representing the trajectory is added to the TSP graph with its corresponding cost. The cost of the trajectory can be determined 445 as any function of its time, distance, energy, etc. There can be multiple traverse-edges connecting a pair of entry and exit nodes.

After the trajectories and corresponding costs of the trajectories are determined, the TSP solver is applied 450 to the graph formed by all entry and exit nodes, cut-edges and traverse-edges. The cut-edges are forced 455 into the solution, and the TSP solver determines a subset of traverse-edges that completes the tour 460. In some embodiments, the complete tour is refined and converted 465 to machine instruction determining the dynamically optimal tour 470.

Figure 5:
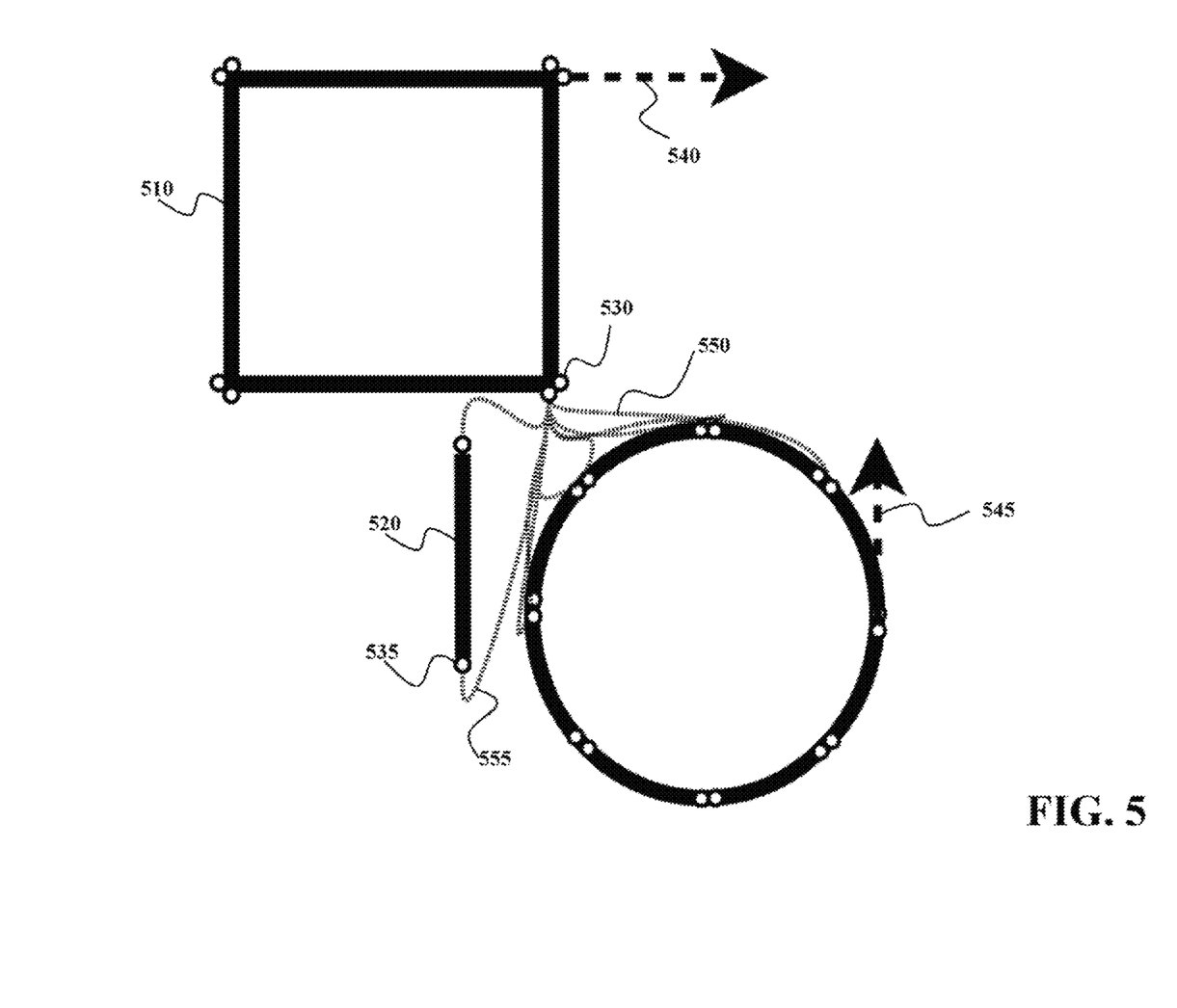
FIG. 5 is a diagram of a part of an exemplar TSP graph according to some embodiments.

FIG. 5 shows a diagram of a part of an exemplar TSP graph, wherein nodes of the graph represent entry and exit points on the contours, cut-edges represent cuts along the contours between adjacent nodes, and traverse-edges represent dynamically optimal trajectories between nodes on different cut contours. The bold lines, such as lines 510 and 520, are edges representing mandatory cuts. These cuts are partitioned into segments. The small open circles, e.g., 530 and 535, depict entry or exit points forming the segments. Wherever a contour is partitioned there are two open circles representing a co-located entry node and exit node. The dashed arrows 540 and 545 depict two exit velocity vectors. Each velocity vector includes a magnitude and a direction of the velocity. Every entry or exit point has such a vector, but only two are shown to reduce clutter in the diagram. The dotted lines, e.g., lines 550 and 555 are examples of the candidate traversal trajectories from a single exit point at the lower right hand corner of the square.

Figure 6:
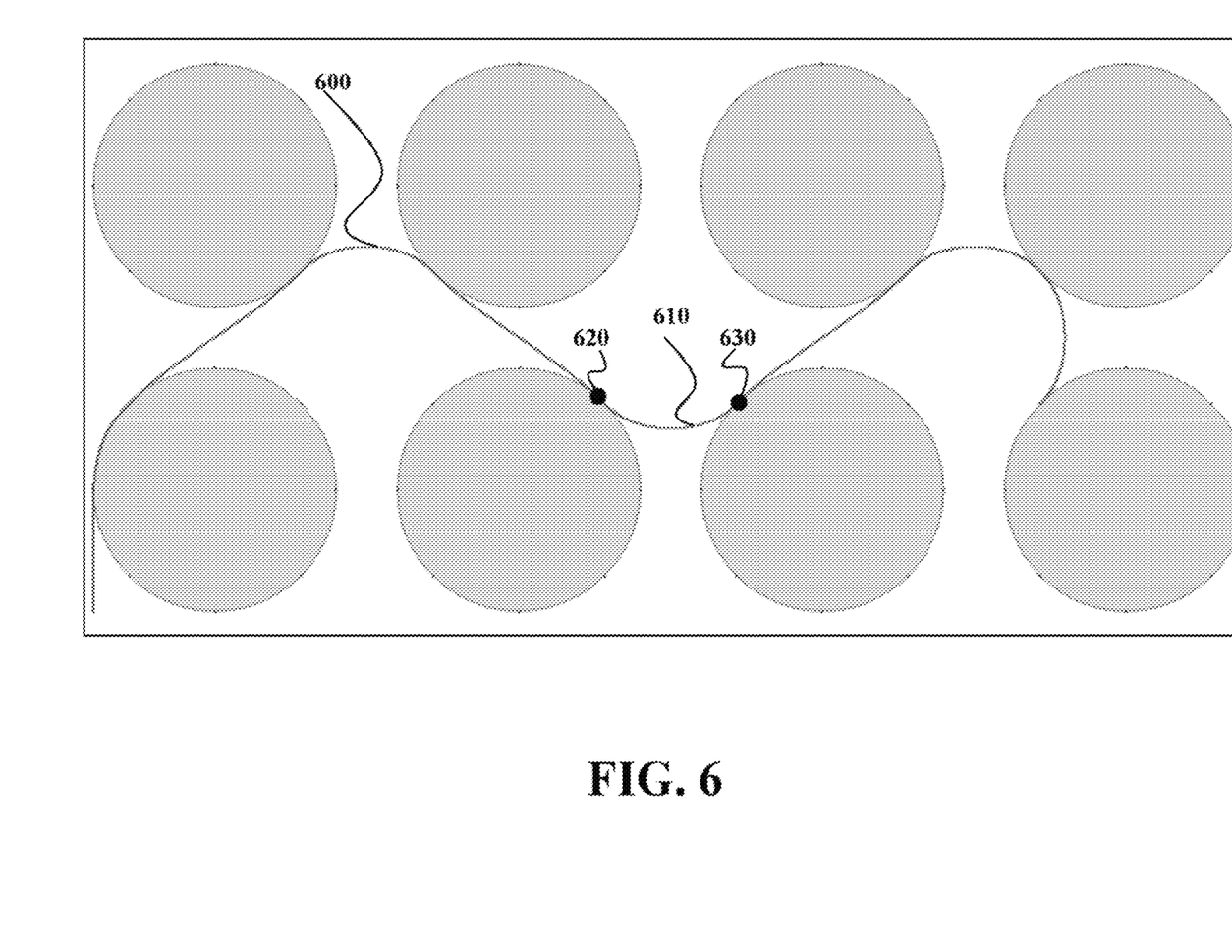
FIG. 6 is an example of a tour determined for a portion of the pattern of FIG. 2 by some embodiments of the invention.

FIG. 6 shows an example of a tour 600 determined for a portion of the pattern 200 of FIG. 2. The tour can be determine by various embodiments of the invention, and is sensitive to the dynamics of the machine, such as the velocities and acceleration limits of the machine. A segment 610 is an example of a trajectory representing the operation between different contours with non-zero velocities at the corresponding exit 620 and entry 630 points.

No-Fly Zones

Figure 7A:
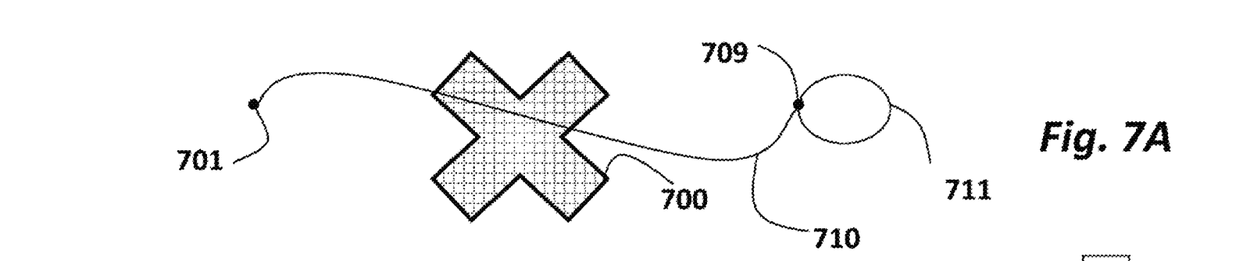
FIGS. 7A-C are examples of detour strategies according to various embodiments of the invention.

In some situations, an optimal traverse trajectory crosses a "no-fly zone," i.e., a part of the work-piece, which, according to the pattern, is sensitive to the crossing. Sometimes, such crossing is not desirable, because can lead to a collisions of the removed parts and the tool-head. For example, as shown in FIG. 7A, a previously cut feature 700 is potentially crossed by a single trajectory 710, from location 701 to location 709 of another contour 711 to be cut. In some embodiments, such trajectory is discarded or repaired.

Figure 7B:
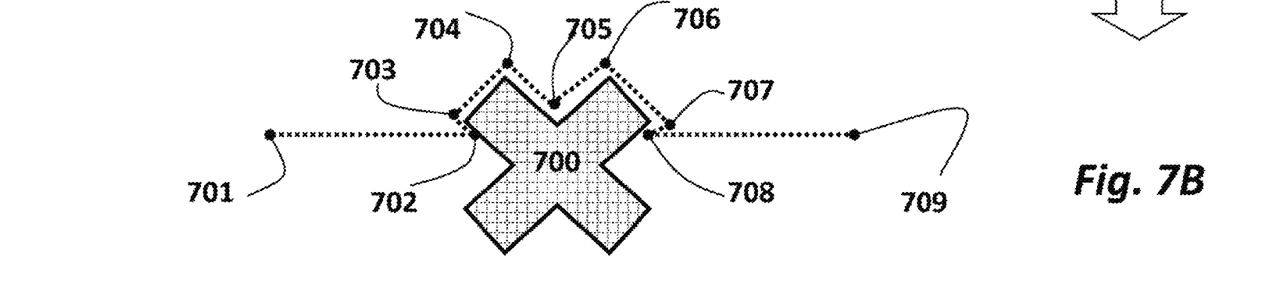

For example, as shown in FIG. 7B, the trajectory is transformed from a single trajectory 710, to a series of segments 701-709 that follow the outline of the feature. This trajectory can be constructed by:

(1) marking the entering and exiting locations 702 and 708 for a particular feature for the original rapid lateral movement 710;
(2) determining a shortest direction of travel around the feature between the entering and exiting locations;
(3) replacing the original rapid lateral segment 710 by a series of short segments that mimic the cutting movements that comprise the followed outline of the feature; and
(4) dilating these segments away from the feature boundary to ensure a collision cannot occur between the cutter head and the previously cut feature.

However, the trajectory produced by the above strategy may not be the optimal movement to avoid crossing the previously cut feature because can involve multiple abrupt movements, and not dynamically optimal.

Figure 7C:
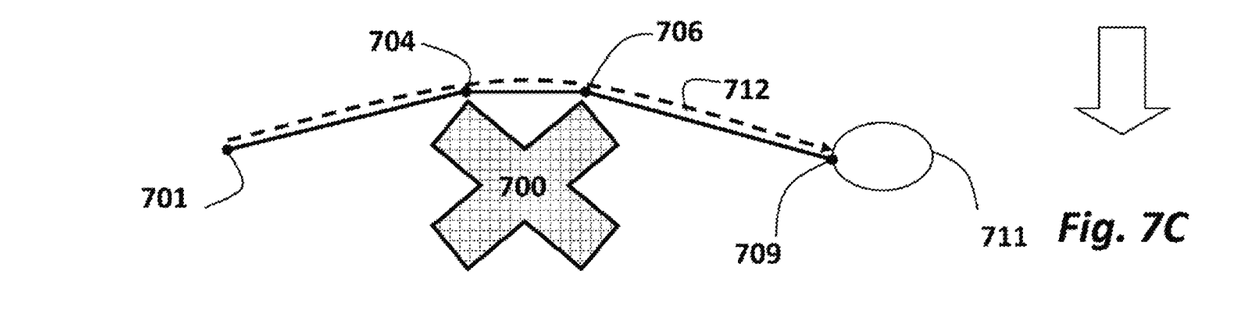

As shown in FIG. 7C, another strategy prunes the series of short segments to only use locations 701, 704, 706 and 709. Only the locations that are necessary to avoid the feature are retained.

This can be accomplished by, starting from the point of view of the exit point 701, selecting the leftmost visible point 704 on the boundary of the no-fly-zone, then from the point of view of that point 704, again selecting the leftmost visible point 706 on the boundary of the no-fly-zone, and repeating this process until one reaches a point with an unobstructed view of the entry point 710, and taking all these points 701 704 706 710 as a template for the traverse. The template is then dilated away from the no-fly-zone, and then one solves for the dynamically optimal trajectory 712 that connects 701 to 710 with correct endpoint velocities while staying to the left of dilated path from 704 to 706. Alternately, by the same procedure, one can route to the right of a no-fly-zone Another embodiment repairs the trajectory using the TSP graph. For example, one embodiment repairs the trajectory by re-solving the optimal motion problem with an added constraint that the trajectory passes through a point, e.g., the point 704, outside the boundary of the no-fly zone. If the repaired constraint also passes through the no-fly zone, then more such constraint points are added and the problem re-solved again.

Traverse-edges representing non-local traversals may also be added to the graph, for example, a traversal from each interior node to nodes on the outermost cut, or even a small number of traversals between randomly selected nodes. These edges add degrees of freedom to the TSP problem that enable more efficient plans to be found, at cost of requiring more computation.

The TSP solver determined a lowest-cost or approximately lowest-cost tour through the graph. The cuts and traverses represented by the edges of this tour comprise the dynamically optimal global trajectory for the cutting head.

Tuning

Various preferences can be encoded in the costs of the traverse trajectories. For example, if it is preferred that all the segments in a closed contour are cut in a single motion, a positive value is added to all costs associated with traversal edges representing traverses that enter or exit those segments, thus discouraging multiple entries and exits. If it is preferred that the cutter follow cut contours around corners rather than move off to do other cuts, a traversal edge can be added whose cost reflects the time or energy costs of slowing down the two adjoining cuts to round the corner accurately.

Given a set of nested cuts, it is often preferred that inner cuts precede outer cuts. Some TSP solvers can accommodate constraints on the order in which nodes appear in the tour. Alternatively, some embodiments check the TSP solution for instances where an enveloping cut are completed before cuts nested inside it. If the TSP solution is found, the tour is checked for the last time that a traverse to the nested cuts flies over the enveloping cut, and at this point the prior enveloping cut is altered so that a tab of material is left to be cut during this last flyover. In the embodiment having a requirement that the closed curves are cut in one motion, the TSP graph is partitioned into nesting graphs, each solved independently, and then cut in an inside-to-outside sequence.

Some embodiments, after determining the sequence of the trajectories in the tour, refine the solution in various ways. For example, for each entry and exit point, a set of nearby alternatives (on the same cut contour) is considered. Using the sequence of cuts determined by the TSP, a globally optimal tour of alternatives can be identified efficiently via dynamic programming, again using traverse trajectory costs as edge weights.

After the TSP solution has determined the dynamically optimal tour for the cutting head, the embodiments determine a set of instructions to the controller of the cutting machine. Some controllers can only process sequences of line segments, and sometimes circular arcs, so, in one embodiment, the trajectories selected by the TSP solution are approximated by a sequence of these geometric primitives. In fitting these primitives to the curve, there is a trade-off between sampling the curve too coarsely, which causes motion errors, and sampling the curve too finely, which overloads the controller and slows down the entire machine. One embodiment greedily determines primitives at the finest sampling rate that does not overload the controller, but this embodiment can be suboptimal. Alternative embodiment fits an overcomplete set of primitives to the curves of the trajectories, so that every part of the curves is covered by multiple overlapping primitives. Then dynamic programming or other solutions are used to find the subset of fitted primitives that best approximates the curve without overloading the controller.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. In this respect, the invention may be embodied as a computer readable storage medium or multiple computer readable media, e.g., a computer memory, compact discs (CD), optical discs, digital video disks (DVD), magnetic tapes, and flash memories. Alternatively or additionally, the invention may be embodied as a computer readable medium other than a computer-readable storage medium, such as a propagating signal.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for controlling a laser cutting machine according to a pattern of disconnected contours, comprising:
    determining a set of exit and entry points on the contours of the pattern;
    determining at least one velocity vector for each point in the set of exit and entry points to produce a plurality of velocity vectors, wherein a direction of the velocity vector for a point is tangential to a shape of the contour at a location of the point, and wherein a magnitude of the velocity vector is a maximum velocity of the laser cutting machine suitable for machining a segment of the contour connected to the location of the point;
    determining, using dynamics of the laser cutting machine, a set of costs representing operations of the machine along a set of trajectories connecting points in the set of exit and entry points on the contours of the pattern, wherein each trajectory represents an operation of the machine proceeding from an exit point with an exit velocity of the velocity vector at the exit point to an entry point with an entry velocity of the velocity vector at the entry point according to dynamics of the machine, wherein the set of trajectories includes at least one trajectory representing the operation along a contour with non-zero velocities at corresponding exit and entry points, and at least one trajectory representing the operation between different contours with non-zero velocities at the corresponding exit and entry points;
    determining, based on a set of costs representing the operation of the laser cutting machine along each trajectory, a sequence of the trajectories optimizing a total cost of operation of the machine tracking the pattern; and
    determining a set of instructions for controlling the laser cutting machine according to the sequence, wherein steps of the method are performed by a processor.

2. The method of claim 1, further comprising:
    determining a velocity vector for each point in the set of exit and entry points based a shape of a contour at each location of the point, and the dynamics of the machine; and
    determining each cost in the set based on velocity vectors of the corresponding exit and the entry points.

3. The method of claim 1, further comprising:
    determining the trajectory between different contours by connecting the velocity vector of the exit point on the contour with the velocity vector of the entry point on the different contour exit velocity and the entry velocity as a maximum velocity suitable for machining a segment of a contour connecting the exit and the entry points.

4. The method of claim 1, further comprising:
    determining the trajectories as dynamical optimal trajectories.

5. The method of claim 1, wherein the determining a set of instructions comprises:
    fitting an over-complete set of motion primitives to the sequence of the trajectories; and
    selecting, using dynamic programming, a subset of the motion primitives from the set of the motion optimizing the total cost of operation.

6. The method of claim 1, further comprising:
    constructing a graph, wherein nodes of the graph represent the entry and exit points, cut-edges represent the trajectories along the contours between corresponding adjacent nodes, and traverse-edges represent the trajectories between nodes on different contours;
    determining a tour through the nodes, the cut-edges, and at least some traverse-edges of the graph, such that the tour optimizes the total cost of the operation; and
    determining the sequence of the trajectories based on the tour.

7. The method of claim 6, wherein each cost represents a time of the operation along the trajectory, and the tour minimizes the time of the operation.

8. The method of claim 6, further comprising:
    determining the plurality of velocity vectors for the nodes based on a maximum velocity suitable for machining the cut-edges formed by adjacent nodes; and
    determining the traverse-edges connecting the nodes on the different contours, such that the traverse-edge connecting corresponding nodes represents the dynamics of the machine achieving corresponding velocity vectors at the corresponding nodes.

9. The method of claim 1, wherein the set of trajectories includes at least two trajectories connecting identical exit and entry nodes, wherein the at least two trajectories have different shape, further comprising:
    optimizing jointly the set of costs to determine a shape of the trajectories of the sequence, an order of the trajectories in the sequence, and time of operation according to each trajectory.

10. The method of claim 1, further comprising:
    selecting a set of alternative trajectories for each trajectory in the tour; and
    updating the tour using a subset of the joint set of original and alternative trajectories based on the cost of each trajectory using dynamic programming.

11. A method for controlling a laser cutting machine according to a pattern of contours, comprising:
    determining a set of exit and entry points on the contours of the pattern;
    determining at least one velocity vector for each point in the set of exit and entry points to produce a plurality of velocity vectors, wherein a direction of the velocity vector of a point is tangential to a shape of the contour at a location of the point, and wherein a magnitude of the velocity vector of the point is a maximum velocity of the laser cutting machine suitable for machining a segment of the contour connected to the location of the point;

determining the dynamically optimal trajectories between different contours of the pattern by connecting pairs of the velocity vector of the point on the contour and the velocity vector of the point on the different contour;

constructing a graph, wherein nodes of the graph represent the entry and exit points on the contours, cut-edges represent cuts along the contours between adjacent nodes, and traverse-edges represent the dynamically optimal trajectories between nodes on different cut contours;

determining a tour through the nodes, the cut-edges, and at least some traverse-edges of the graph, such that the tour optimizes a total cost of performance; and converting the tour into a set of instruction for controlling the machine, wherein steps of the method are performed by a processor.

12. The method of claim 11, wherein the dynamical optimal traverse trajectories are constrained to route around no-fly zones.

13. The method of claim 11, wherein the converting comprises:
fitting an over-complete set of motion primitives to the tour; and
selecting, using dynamic programming, a subset of the motion primitives from the set of the motion primitives based on a cost of machining of each motion primitive.

14. The method of claim 11, wherein the graph is a traveling salesman problem (TSP) graph, further comprising:
applying a TSP solver to the graph while forcing the nodes and the cut-edges into a solution to produce the tour.

15. The method of claim 11, wherein the constructing comprises:
partitioning the contours of the pattern into a set of cut-edges, wherein end points of the cut-edges form the nodes of the graph;
determining a velocity vector for each node based on a profile of a cut-edge corresponding to a node and a maximum velocity suitable for cutting the cut-edge; and
determining the traverse-edges connecting the nodes on the different contours, such that a traverse-edge connecting two nodes represents the dynamics of the machine achieving the velocity vectors of the two nodes.

16. The method of claim 11, further comprising:
determining the traverse-edges for neighboring nodes.

17. The method of claim 11, further comprising:
determining a cost of the performance along the cut-edges and the traverse-edges to produce a set of costs;
modifying the set of costs according to a set of preferences; and
optimizing jointly the set of costs to determine the tour optimizing the total cost of the performance.

18. A laser cutting machine, comprising:
a laser cutter for cutting a work-piece according to a pattern;
a control module for navigating the laser cutter according to a set of instruction, such that the laser cutter tracks cut-edges and traverse-edges without stopping; and
a motion planning module for generating the set of instruction based on the pattern, wherein the set of instruction is generated based on a tour optimizing a total cost of operation of the laser cutter tracking the pattern, wherein the motion planning module determines a set of cut-edges and a set of traverse-edges, wherein a trajectory in the set of traverse-edges is a dynamically optimal trajectory connecting pairs of a velocity vector of a point on the contour and a velocity vector of a point on the different contour, wherein a direction of the velocity vector of each point is tangential to a shape of the contour at a location of the point, and wherein a magnitude of the velocity vector of the point is a maximum velocity of the laser cutting machine suitable for machining a segment of the contour connected to the location of the point, and wherein the motion planning module applies a traveling salesman problem (TSP) solver to produce the tour.

19. The laser cutting machine of claim 18, wherein the traverse-edges are constrained to route around no-fly zones.

20. The laser cutting machine of claim 18, wherein the set of instruction is determined based on fitting motion primitives into the tour.

21. A method for determining a set of instructions for controlling a laser cutting machine according to a pattern of disconnected contours, comprising:
acquiring the pattern of disconnected contours and at least one of dynamics of the laser cutting machine;
determining a set of points on the contours of the pattern;
determining at least one velocity vector for each point in the set of points to produce a plurality of velocity vectors, wherein a direction of each velocity vector at a point is tangential to a shape of the contour at a location of the point, and wherein a magnitude of each velocity vector at the point is a maximum velocity of the laser cutting machine suitable for machining a segment of the contour connected to the location of the point, wherein the maximum velocity is determined based on a shape of the segment and the dynamics of the laser cutting machine;
determining the dynamically optimal trajectories between different contours of the pattern by connecting pairs of the velocity vector at the point on the contour and the velocity vector at the point on the different contour; and
generating a set of instructions for controlling the machine according to a sequence of the trajectories optimizing a total cost of operation of the machine tracking the pattern, wherein the sequence of trajectories includes at least one trajectory representing the operation along a contour with non-zero velocities at corresponding exit and entry points, and at least one trajectory of the dynamically optimal trajectories representing the operation between different contours with non-zero velocities at the corresponding exit and entry points, wherein steps of the method are performed by a processor.

22. The method of claim 21, wherein the dynamics of the machine includes a maximum acceleration.

23. The method of claim 21, wherein the set of instructions controls position, velocity and ON/OFF signal of machining work-piece according to the pattern.

24. The method of claim 21, wherein the machine does not stop for tracking trajectories representing the operation between different contours.

* * * * *